United States Patent
Lye et al.

(10) Patent No.: US 9,383,833 B2
(45) Date of Patent: Jul. 5, 2016

(54) NAVIGATION DEVICE AND POWER SAVING METHOD THEREOF

(71) Applicant: PixArt Imaging Inc., Hsin-Chu County (TW)

(72) Inventors: Keng-Yeen Lye, Penang (MY); Keng-Yeam Chang, Penang (MY)

(73) Assignee: PIXART IMAGING INC., Hsin-Chu County (TW)

( * ) Notice: Subject to any disclaimer, the term of this patent is extended or adjusted under 35 U.S.C. 154(b) by 350 days.

(21) Appl. No.: 13/859,145

(22) Filed: Apr. 9, 2013

(65) Prior Publication Data

US 2014/0300548 A1  Oct. 9, 2014

(51) Int. Cl.
*G06F 3/0354* (2013.01)
*G06F 1/32* (2006.01)

(52) U.S. Cl.
CPC .......... *G06F 3/03543* (2013.01); *G06F 1/3259* (2013.01)

(58) Field of Classification Search
CPC .................................................... G06F 1/3259
See application file for complete search history.

(56) References Cited

U.S. PATENT DOCUMENTS

| 6,275,948 B1* | 8/2001 | Bays et al. ..................... 713/320 |
| 2004/0155860 A1 | 8/2004 | Wenstrand et al. |
| 2005/0110746 A1* | 5/2005 | Hou .............................. 345/156 |
| 2012/0198258 A1* | 8/2012 | Lye et al. ...................... 713/323 |
| 2014/0300548 A1* | 10/2014 | Lye et al. ...................... 345/163 |

FOREIGN PATENT DOCUMENTS

| TW | 200415499 A | 8/2004 |
| TW | 200515300 A | 5/2005 |
| TW | 200517823 A | 6/2005 |

* cited by examiner

*Primary Examiner* — Quan-Zhen Wang
*Assistant Examiner* — Xuemei Zheng
(74) *Attorney, Agent, or Firm* — Hauptman Ham, LLP

(57) ABSTRACT

A navigation device includes an image sensor, a processing unit, a main clock circuit and an auxiliary clock circuit, wherein a clock frequency of the auxiliary clock circuit is much lower than that of the main clock circuit. The image sensor captures a predetermined number of image frames in a burst period. The processing unit is configured to calculate a displacement according to the image frames, to disable the main clock circuit after the predetermined number of image frames have been captured by the image sensor and to restart the main clock circuit with the auxiliary clock circuit before the end of the burst period.

19 Claims, 4 Drawing Sheets

US 9,383,833 B2

NAVIGATION DEVICE AND POWER SAVING METHOD THEREOF

BACKGROUND

1. Field of the Disclosure

This disclosure generally relates to an input device and, more particularly, to an optical navigation device and a power saving method thereof.

2. Description of the Related Art

A user can interact with a display device through various input devices such as a touch panel, a pointing device, an optical mouse, a keyboard and etc. In order to increase the operational convenience, some peripheral devices can communication with the display device using the wireless technologies but the peripheral devices using wireless communication technologies do not have a power line directly connected to a power supply such that various power saving mechanisms are provided for extending the lifetime of battery.

For example in an optical mouse, when the optical mouse is not operated by a user for a predetermined time interval, a sleep mode is entered. In the sleep mode, for example it is able to use a slow clock signal so as to decrease the total power consumption. For example referring to FIG. 1, it shows two clock signals used in the conventional optical mouse, e.g. including a main clock (main CLK) and a sleep clock (sleep CLK), and the two clock signals are generated simultaneously. In the normal operation mode the optical mouse operates at the main clock and in the sleep mode the optical mouse operates at the sleep clock. However, this power saving mechanism can save power only in the sleep mode but can not save power in the normal operation mode.

Accordingly, the present disclosure further provides a navigation device and a power saving method thereof that may save power in both the normal operation mode and the sleep mode so as to effectively reduce the total power consumption of the device.

SUMMARY

The present disclosure provides a navigation device and a power saving method thereof that may disable a main clock circuit for a predetermined period in the normal operation mode and may read and process only a part of pixel data in the sleep mode so as to effectively reduce the total power consumption.

The present disclosure provides a navigation device and a power saving method thereof that calculate and report a displacement with a burst mode in the normal operation mode.

The present disclosure provides a navigation device including a main clock circuit, an auxiliary clock circuit, an image sensor and a processing unit. The main clock circuit is configured to generate a first clock signal with a first frequency. The auxiliary clock circuit is configured to generate a second clock signal with a second frequency, wherein the second frequency is lower than the first frequency. The image sensor is configured to capture a first image, a second image and a third image according to the first clock signal within a burst period of a burst mode. The processing unit is configured to calculate the displacement according to the first image, the second image and the third image, and to disable the main clock circuit at a predetermined time after receiving the third image from the image sensor.

The present disclosure further provides a navigation device including a main clock circuit, an auxiliary clock circuit, an image sensor and a processing unit. The main clock circuit is configured to generate a first clock signal with a first frequency. The auxiliary clock circuit is configured to generate a second clock signal with a second frequency, wherein the second frequency is lower than the first frequency. The image sensor is configured to capture a plurality of image frames according to the first clock signal within a burst period of a burst mode. The processing unit is configured to control the image sensor to capture the plurality of image frames in a first period of the burst period, to disable the main clock circuit in a second period of the burst period and to calculate the displacement according to the plurality of image frames.

The present disclosure further provides a power saving method of a navigation device including the steps of: capturing, using an image sensor, a plurality of image frames according to a first clock signal within a burst period of a burst mode; calculating a displacement according to the plurality of image frames with a processing unit; and disabling the first clock signal in the rest of the burst period after the displacement is calculated.

In one aspect, in the turn-off time of the first clock circuit, when the navigation device is required to output the displacement, the main clock circuit may be temporarily enabled so as to report the displacement to a host, wherein the host may control the motion of a cursor shown on a display device according to the displacement.

In one aspect, when the processing unit identifies that a predetermined number of displacements are smaller than a displacement threshold, a sleep mode is entered. In the sleep mode, the processing unit may read and process only a part of pixel regions of a sensing matrix of the image sensor.

In one aspect, the processing unit may further restart the main clock circuit with the second clock signal before the end of the burst period.

In the navigation device and the power saving method according to the embodiment of the present disclosure, in the normal operation mode the main clock circuit is disabled in a part of a burst period so as to save power; and in the sleep mode, besides operating at an auxiliary clock having a lower frequency, the processing unit may only process data of a part of pixel regions of the image frames captured such that the power saving mechanism may be implemented in different modes thereby effectively extending the lifetime of battery.

BRIEF DESCRIPTION OF THE DRAWINGS

Other objects, advantages, and novel features of the present disclosure will become more apparent from the following detailed description when taken in conjunction with the accompanying drawings.

DETAILED DESCRIPTION OF THE EMBODIMENT

It should be noted that, wherever possible, the same reference numbers will be used throughout the drawings to refer to the same or like parts.

Figure 1:
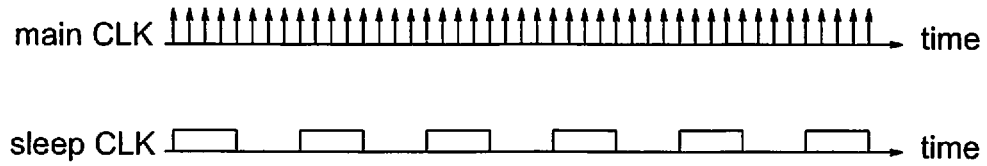
FIG. 1 shows a schematic diagram of two clock signals used in the conventional optical mouse.
Figure 2:
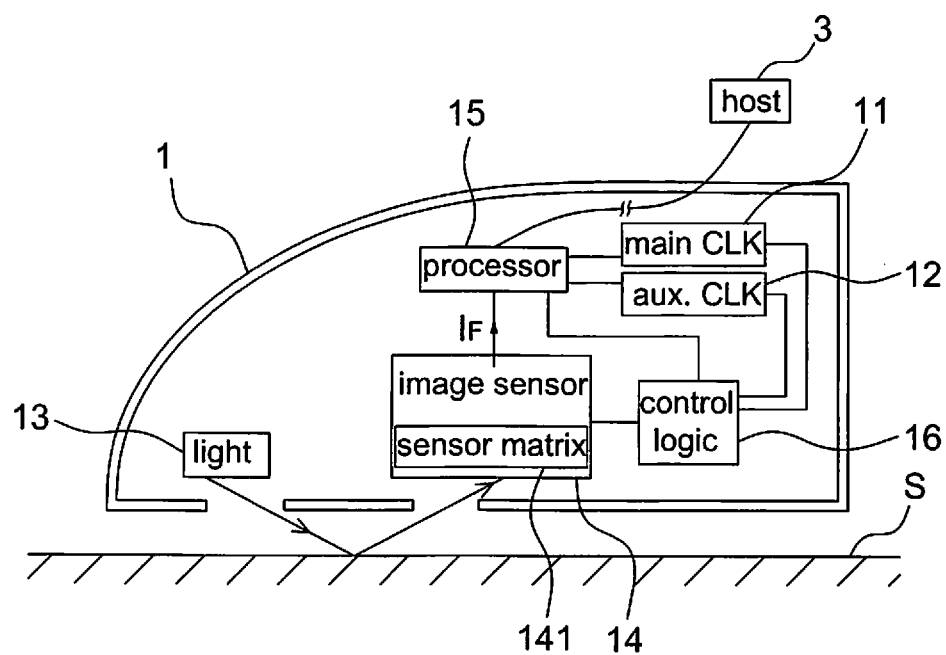
FIG. 2 shows a schematic block diagram of the navigation device according to an embodiment of the present disclosure.

Referring to FIG. 2, it shows a schematic block diagram of the navigation device according to an embodiment of the present disclosure. The navigation device 1 includes a main clock circuit 11, an auxiliary clock circuit 12, a light source 13, an image sensor 14, a processing unit and a control logic 16. The main clock circuit 11 is mainly configured to provide the navigation device 1 with needed clock signals in a normal operation mode and the auxiliary clock circuit 12 is mainly configured to provide the navigation device 1 with needed clock signals in a sleep mode, wherein comparing to the normal operation mode, the sleep mode means that at least a part of components of the navigation device 1 stop or slow down the operation in order to reduce the power consumption. The definition of the sleep mode is well known and thus details thereof are not described herein.

For example, the main clock circuit 11 may generate a first clock signal (i.e. a main clock) having a first frequency and the auxiliary clock circuit 12 may generate a second clock signal (i.e. an auxiliary clock) having a second frequency, wherein the second frequency is preferably much lower than the first frequency so as to increase the saved power. In one embodiment, the first frequency may be 24 MHz and the second frequency may be 1000 Hz or 2000 Hz. It is appreciated that values of the first frequency and the second frequency are not limited to the values mentioned herein as long as the frequencies used may be applied to general navigation devices and the second frequency is much lower than the first frequency. In addition, the first frequency is preferably a multiple times of the second frequency.

The navigation device 1 may be a detection device, such as an optical mouse, capable of detecting a displacement with respect to a work surface S, and the navigation device 1 may calculate and report a displacement with a burst mode in the normal operation mode.

The light source 13 may be at least one light emitting diode (LED), laser diode (LD) or other proper active light sources configured to illuminate the work surface S so as to provide the light needed by the image sensor 14 in capturing images. In one embodiment, a lighting frequency of the light source 13 may be equal to or lower than a sampling frequency of the image sensor 14.

The image sensor 14 may be an active image sensor, e.g. a CMOS image sensor or other sensors capable of converting optical energy to electric signals. The image sensor 14 may include a sensing matrix 14 which is formed by arranging a plurality of pixels in matrix. In the normal operation mode, the image sensor 14 captures a plurality of image frames $I_F$ according to the first clock signal within a burst period of the burst mode (described later).

The processing unit 15 may be a processor capable of processing the image data outputted from the image sensor 14, e.g. a digital signal processor (DSP). In this embodiment, the processing unit 15 is coupled to other components and is configured to control the image sensor 14 to capture a plurality of image frames $I_F$ in a first period of the burst period, to disable the main clock circuit 11 in a second period of the burst period and to calculate the displacement according to the image frames $I_F$, wherein said first period may be an initial time interval of the burst period which is served as a navigation interval of the displacement detection and the second period may be the rest interval of the burst period after the first period. In the present disclosure, as the first clock signal is only for counting a start point of a next burst period within the second period, the first clock signal may be replaced by the second clock signal having a lower frequency to count the start point so as to reduce the total power consumption. In addition, the processing unit 15 is further configured to restart the main clock circuit before an end of the burst period according to the second clock signal. In this embodiment, the first period may start from a start point of the burst period to a predetermined time after the image sensor 14 has captured all the predetermined number of image frames, wherein the predetermined time may be determined according to a calculation time interval for calculating the displacement by the processing unit 15 or may be a fixed ratio of the burst period (described later by an example).

After the processing unit 15 obtains a displacement in each burst period, the displacement is wired or wirelessly transmitted to a host 3. For example, the processing unit 15 may output the displacement at a fixed report rate or after receiving a request from the host 3. The host 3 may correspondingly control the motion of a cursor shown on a display device (not shown) according to the displacement, wherein the method of controlling a cursor according to the displacement data by a host is well known and thus details thereof are not described herein. The spirit of the present disclosure is to reduce the total power consumption of the navigation device 1.

Figure 3A:
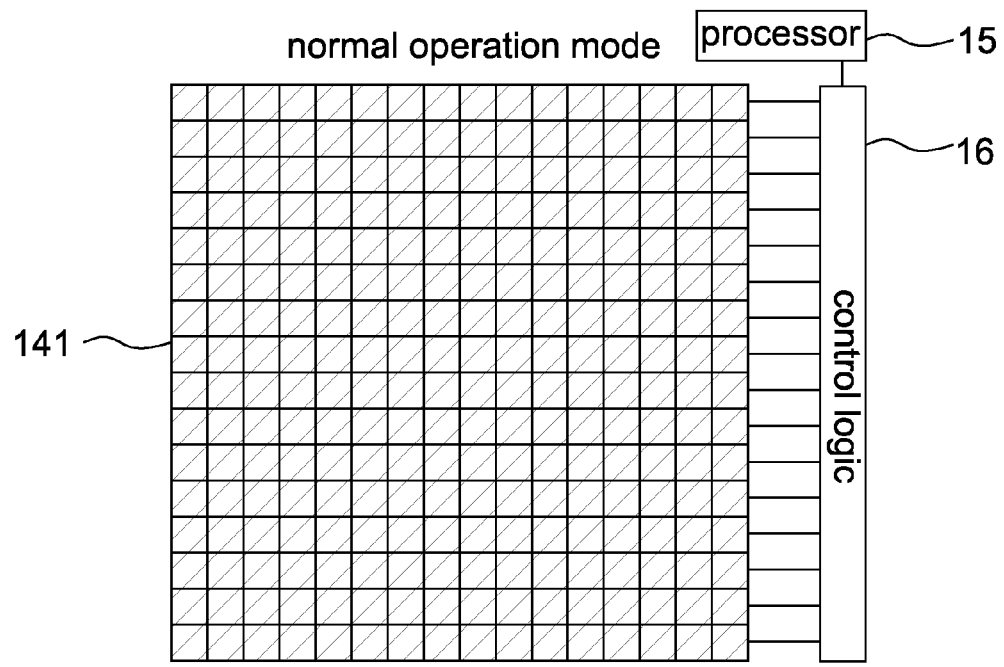
FIG. 3A shows a schematic diagram of the whole image frame processed by the navigation device according to the embodiment of the present disclosure in a normal operation mode.
Figure 3B:
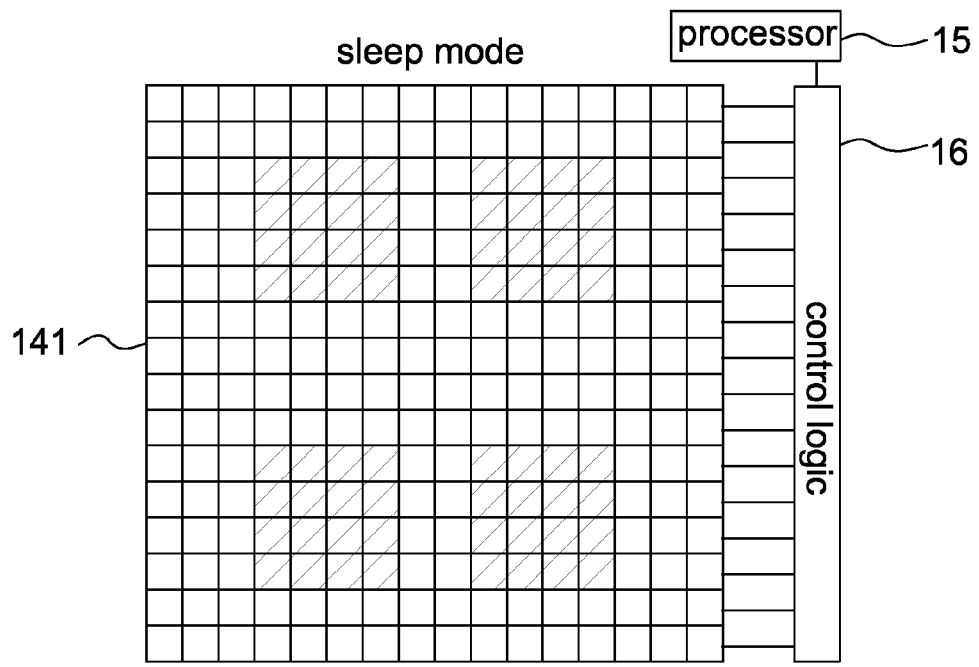
FIG. 3B shows a schematic diagram of the part of image regions of an image frame processed by the navigation device according to the embodiment of the present disclosure in a sleep mode.

The control logic 16 is configured to control the pixels in the sensing matrix 141 of the image sensor 14 to be read by the processing unit 15. In this embodiment, in the normal operation mode the processing unit 15 controls the control logic 16 to read all pixel data of the sensing matrix 141 as shown by oblique lines in FIG. 3A. In the sleep mode the processing unit 15 controls the control logic 16 to read only a part of pixel regions of the sensing matrix 141 as shown by regions filled with oblique lines in FIG. 3B. In this manner, since the processing unit 15 processes only a part of pixel regions of the image frames captured by the image sensor 14, the power for processing the image data can be reduced in the sleep mode.

In one embodiment, when the processing unit 15 identifies that a predetermined number of displacements are all smaller than a displacement threshold, the sleep mode is entered. In the sleep mode the navigation device 1 operates according to the second clock signal so as to further decrease the consuming power. In addition, the part of pixel regions selected and processed by the processing unit 15 are preferably unsaturated pixel regions so as to prevent errors in identification. For example as shown in FIG. 2, when the image sensor 14 is located at an optical path of the main beam of the light source 13, the selected pixel regions preferably do not contain a center pixel region of the sensing matrix 141 (FIG. 3B) because the brightness of the center pixel region is generally saturated and it may be difficult to identify whether a variation occurs or not. It should be mentioned that as the selected pixel regions are to be processed by the processing unit 15 for identifying whether a variation of the image feature exists therein so as to return from the sleep mode to the normal operation mode, the part of pixel regions selected are not limited to those shown in FIG. 3B as long as the selected pixel regions may be used to identify the variation of the image feature and the size of the selected pixel regions does not have any limitation. For example, the variation of the image feature may be a position variation of a pixel having a maximum intensity in the selected pixel regions, but not limited thereto.

For example, the variation of the image feature may also be a position variation of two adjacent pixels having a maximum intensity difference in the selected pixel regions.

Figure 4A:
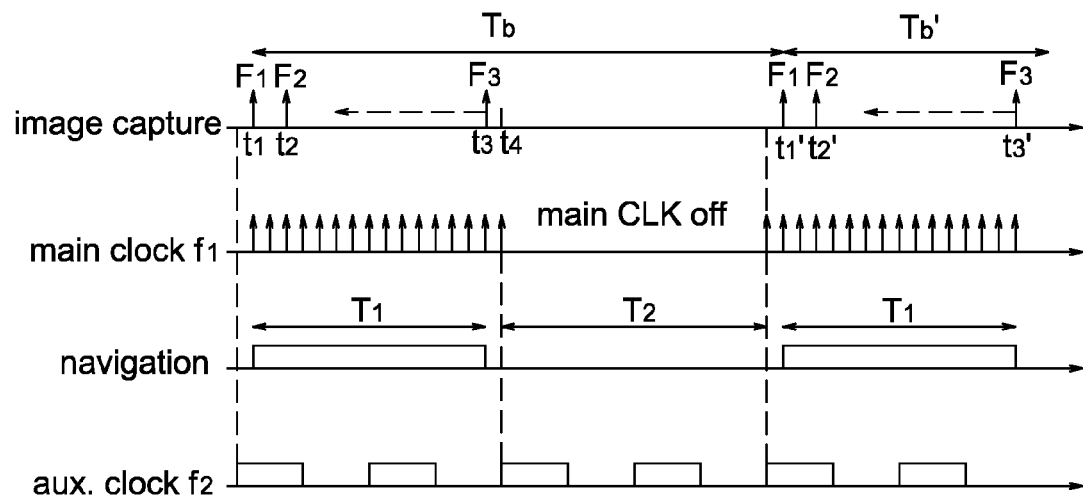
FIG. 4A shows an operational schematic diagram of the navigation device according to the embodiment of the present disclosure.
Figure 4B:
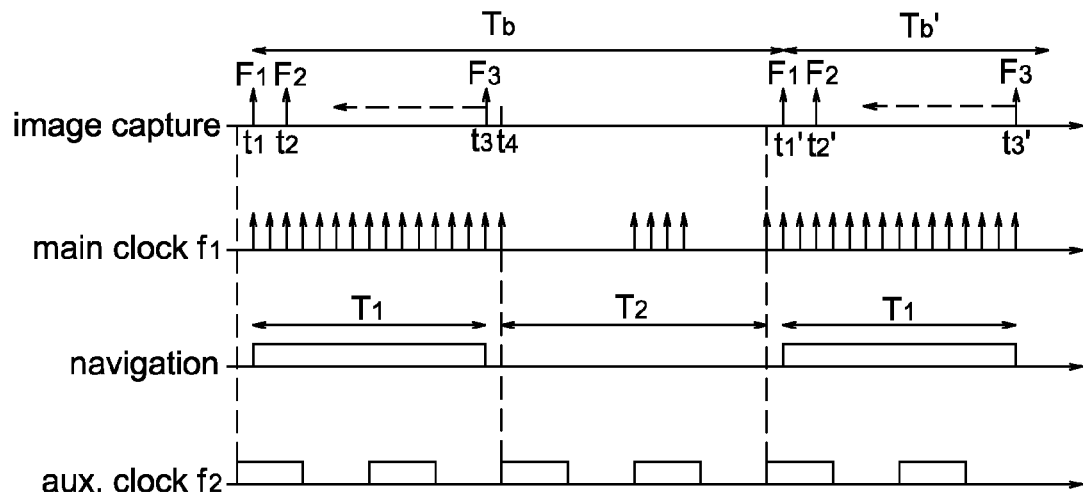
FIG. 4B shows another operational schematic diagram of the navigation device according to the embodiment of the present disclosure.

Referring to FIGS. 4A and 4B, they respectively show an operational schematic diagram of the navigation device in the normal operation mode according to the embodiment of the present disclosure. In FIG. 4A, the image sensor 14 captures a first image $F_1$, a second image $F_2$ and a third image $F_3$ according to a first clock signal $f_1$ within a first period $T_1$ of a burst period Tb, and does not capture any image in a second period $T_2$, and thus in the present disclosure this operation is referred to the burst mode. The processing unit 15 then calculates the displacement according to the first image $F_1$, the second image $F_2$ and the third image $F_3$, and disables the main clock circuit 11 at a predetermined time (e.g. time $t_4$) after receiving the third image $F_3$ from the image sensor 14. In one embodiment, the processing unit 15 may calculate a first displacement according to the first image $F_1$ and the second image $F_2$, and calculate a second displacement according to the second image $F_2$ and the third image $F_3$. The processing unit 15 may output an output displacement to the host 3 in the second period $T_2$ of every burst period Tb, wherein the output displacement may be the first displacement, the second displacement, an average displacement of the first and second displacements or a weighted displacement of the first and second displacements.

For example in this embodiment, the image sensor 14 captures a first image $F_1$ at time $t_1$, a second image $F_2$ at time $t_2$ and a third image $F_3$ at time $t_3$, wherein a first time interval $(t_2-t_1)$ between the first time $t_1$ and the second time $t_2$ is preferably a fixed value and a second time interval $(t_3-t_2)$ between the second time $t_2$ and the third time $t_3$ is preferably larger than the first time interval $(t_2-t_1)$. In one embodiment, the second time interval $(t_3-t_2)$ may be determined by the processing unit 15 according to the first displacement. For example, when the first displacement is larger the second time interval $(t_3-t_2)$ becomes smaller and when the first displacement is smaller the second time interval $(t_3-t_2)$ becomes larger; that is, a sampling time $t_3$ of the third image $F_3$ may not be fixed and the sampling time $t_3$ preferably does not exceed the first period $T_1$, wherein the first period $T_1$ may be determined according to the first frequency of the first clock circuit 11 and a size of the sensing matrix 141. In one embodiment, the first period $T_1$ may be a fixed ratio of the burst period Tb and the processing unit 15 may shut down the main clock circuit 11 at the end of the first period $T_1$ or at a fixed time (e.g. determined according to the calculation time interval for calculating the displacement) after the end of the first period $T_1$. In another embodiment, the time $t_4$ may be a predetermined time after the processing unit 15 receives the third image $F_3$. In other words, in this embodiment a time interval that the processing unit 15 disables the first clock circuit 11 may or may not be fixed according to different embodiments as long as the time interval is after the displacement being obtained and before a next burst period Tb'. It is appreciated that the longer the first clock circuit 11 is disabled, the more power is saved.

The processing unit 15 may report the displacement to the host 3 at a proper time within the second period $T_2$. For example, the processing unit 15 may report the displacement after receiving the message from the host 3. When the processing unit 15 is requested to report the displacement, the main clock circuit 11 may be temporarily enabled so as to report the displacement in the second period $T_2$ as shown in FIG. 4B, wherein as mentioned above the main clock circuit 11 may be enabled with the second clock signal. When the displacement is reported and the next burst period Tb' does not start, the first clock circuit 11 may be disabled again or may continuously operate to the next burst period Tb'.

It is appreciated that although FIGS. 4A and 4B show that three image frames (e.g. $F_1$-$F_3$) are captured within each burst period Tb (Tb'), the present disclosure is not limited thereto. The number of the image frames captured within a burst period may be determined according to the algorithm for calculating the displacement. In addition, although FIGS. 4A and 4B show that the second clock signal (i.e. the auxiliary clock $f_2$) leads the first clock signal (i.e. the main clock $f_1$) by one first cycle (i.e. the cycle of the first clock signal), the present disclosure is not limited thereto. The second clock signal may lead the first clock signal by a proper time in order to enable other components previous to the image sensor, e.g. lighting the light source 13 in an earlier time.

Figure 5:
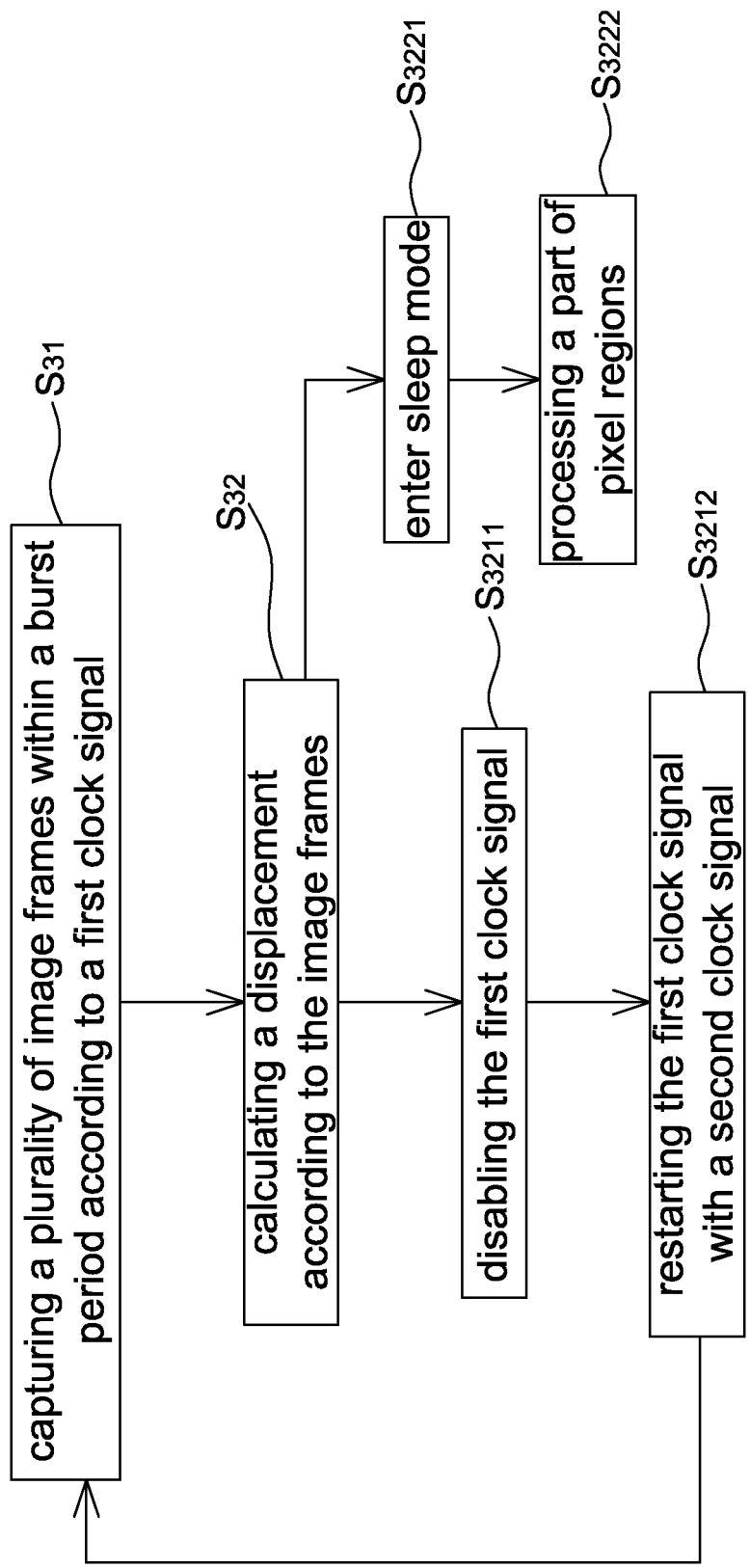
FIG. 5 shows a flow chart of the power saving method of the navigation device according to the embodiment of the present disclosure.

Referring to FIG. 5, it shows a flow chart of the power saving method of the navigation device according to the embodiment of the present disclosure including the steps of: capturing a plurality of image frames within a burst period according to a first clock signal (Step $S_{31}$); calculating a displacement according to the image frames (Step $S_{32}$); disabling the first clock signal (Step $S_{3211}$); restarting the first clock signal with a second clock signal (Step $S_{3212}$); entering a sleep mode (Step $S_{3221}$); and processing a part of pixel regions (Step $S_{3222}$).

Referring to FIGS. 2, 4A, 4B and 5, details of the power saving method of the navigation device of the present embodiment will be illustrated hereinafter.

Step $S_{31}$: The image sensor 14 captures a plurality of image frames $I_F$ within every burst period Tb according to a first clock signal, and preferably the image frames are captured from the beginning of the burst period Tb, e.g. $F_1$-$F_3$ shown in FIGS. 4A and 4B.

Step $S_{32}$: The processing unit 15 then calculates a displacement according to the image frames $I_F$, e.g. calculating the displacement according to the correlation between two image frames. In addition, as mentioned above the displacement obtained in a burst period Tb may be different combinations of at least two displacements. For example, if four image frames are captured in every burst period, an output displacement may be one or a combination of three displacements obtained according to different pairs of the image frames.

Step $S_{3211}$: In the normal operation mode, at a predetermined time (e.g. time $t_4$) after the processing unit 15 obtains the displacement, the main clock circuit 11 is disabled to save the consuming power. For example, if it is assumed that the processing unit 15 obtains the displacement at time $t_4$, a time interval $(t_4-t_3)$ may determine the predetermined time; that is, the calculation time interval of calculating the displacement. As mentioned above, the processing unit 15 may disable the main clock circuit 11 at a fixed time in the burst period Tb. Or the turn-off time of the main clock circuit 11 may be changed according to the sampling time of a last image frame (e.g. $F_3$ herein) of the image frames captured within one burst period.

Step $S_{3212}$: In the time interval that the main clock circuit 11 is disabled, a start time (e.g. time $t_1'$) of a next burst period (e.g. Tb') is counted using the auxiliary clock circuit 12. Therefore, before the beginning of the next burst period Tb', the processing unit 15 may restart the first clock signal with the second clock signal, and the first clock signal is preferably restated a little earlier than the beginning of the next burst period Tb' so as to enable a part of the components, e.g. enabling the light source 13 to illuminate the work surface S.

Step $S_{3221}$: When the processing unit 15 identifies that a predetermined number of displacements are smaller than a displacement threshold, a sleep mode is entered, wherein values of the predetermined number and the threshold may be determined according to the system sensitivity and components used.

Step $S_{3222}$: In the sleep mode, besides a part of the components are shut down or slowed down, the processing unit 15 may further control the control logic 16 to read only a part of pixel regions of the sensing matrix 141 (e.g. the regions filled with oblique lines in FIG. 3B) of the image sensor 14. As mentioned above, said a part of pixel regions are preferably a plurality of unsaturated pixel regions.

As mentioned above, the conventional optical mouse can save the system power only in the sleep mode and the power saving mechanism is not included in the normal operation mode. Therefore, the present disclosure further provides a navigation device (FIG. 2) and a power saving method thereof (FIG. 5) that may save system power in the normal operation mode by disabling the main clock circuit for a part of time interval and may further process only a part of pixel data in the sleep mode so as to effectively reduce the total power consumption of the navigation device.

Although the disclosure has been explained in relation to its preferred embodiment, it is not used to limit the disclosure. It is to be understood that many other possible modifications and variations can be made by those skilled in the art without departing from the spirit and scope of the disclosure as hereinafter claimed.

What is claimed is:

1. A navigation device, configured to report a displacement with a burst mode in a normal operation mode, the navigation device comprising:
    a main clock circuit configured to generate a first clock signal with a first frequency;
    an auxiliary clock circuit configured to generate a second clock signal with a second frequency, wherein the second frequency is lower than the first frequency;
    an image sensor configured to capture a first image, a second image and a third image according to the first clock signal within a burst period of the burst mode; and
    a processing unit configured to
        calculate the displacement according to the first image, the second image and the third image, and
        disable the main clock circuit to stop generating the first clock signal at a predetermined time after receiving the third image from the image sensor,
    wherein a start point of a next burst period is counted by using the second clock signal generated by the auxiliary clock circuit.

2. The navigation device as claimed in claim 1, wherein the predetermined time is determined according to a calculation time interval needed for calculating the displacement by the processing unit.

3. The navigation device as claimed in claim 1, wherein the predetermined time is a fixed ratio of the burst period.

4. The navigation device as claimed in claim 1, wherein the first image and the second image are separated by a first time interval, and the second image and the third image are separated by a second time interval longer than the first time interval.

5. The navigation device as claimed in claim 4, wherein the second time interval is determined by a first displacement calculated according to the first image and the second image.

6. The navigation device as claimed in claim 1, wherein when the processing unit is requested to report the displacement, the main clock circuit is temporarily enabled.

7. The navigation device as claimed in claim 1, wherein when the processing unit identifies that a predetermined number of the displacements are smaller than a displacement threshold, a sleep mode is entered.

8. The navigation device as claimed in claim 7, further comprising a control logic, wherein in the sleep mode the processing unit is configured to control the control logic to read only a part of pixel regions of a sensing matrix of the image sensor.

9. The navigation device as claimed in claim 8, wherein the part of pixel regions does not include a center pixel region of the image matrix.

10. The navigation device as claimed in claim 8, wherein the part of pixel regions includes unsaturated pixel regions.

11. The navigation device as claimed in claim 7, wherein in the sleep mode the navigation device is configured to operate according to the second clock signal.

12. A navigation device, configured to calculate a displacement with a burst mode in a normal operation mode, the navigation device comprising:
    a main clock circuit configured to generate a first clock signal with a first frequency;
    an auxiliary clock circuit configured to generate a second clock signal with a second frequency, wherein the second frequency is lower than the first frequency;
    an image sensor configured to capture a plurality of image frames according to the first clock signal within a burst period of the burst mode; and
    a processing unit configured to
        control the image sensor to capture the plurality of image frames in a first period of the burst period,
        disable the main clock circuit to stop generating the first clock signal in a second period of the burst period, the second period subsequent to the first period, and
        calculate the displacement according to the plurality of image frames,
    wherein a start point of a next burst period is counted by using the second clock signal generated by the auxiliary clock circuit.

13. The navigation device as claimed in claim 12, wherein the navigation device is configured to operate according to the second clock signal when entering a sleep mode.

14. The navigation device as claimed in claim 13, wherein the processing unit is configured to process only a part of pixel regions of image frames captured by the image sensor in the sleep mode.

15. The navigation device as claimed in claim 12, wherein the second frequency is 1000 Hz or 2000 Hz.

16. The navigation device as claimed in claim 12, wherein the processing unit is further configured to restart the main clock circuit to generate the first clock signal by the second clock signal in a third period subsequent to the second period.

17. A power saving method of a navigation device, the navigation device calculating a displacement with a burst mode in a normal operation mode, the power saving method comprising:
    capturing, using an image sensor, a plurality of image frames according to a first clock signal generated by a main clock circuit within a burst period of the burst mode;
    calculating a displacement according to the plurality of image frames with a processing unit;
    disabling the main clock circuit to stop generating the first clock signal in the rest of the burst period after the displacement is calculated; and
    counting a start point of a next burst period by using a second clock signal generated by an auxiliary clock circuit, wherein a frequency of the second clock signal is lower than that of the first clock signal.

18. The power saving method as claimed in claim 17, further comprising:
   restarting the main clock circuit to generate the first clock signal by the second clock signal.

19. The power saving method as claimed in claim 17, further comprising:
   entering a sleep mode when a predetermined number of the displacements are lower than a displacement threshold; and
   processing only a part of pixel regions of image frames captured by the image sensor.

* * * * *